Patented July 5, 1932

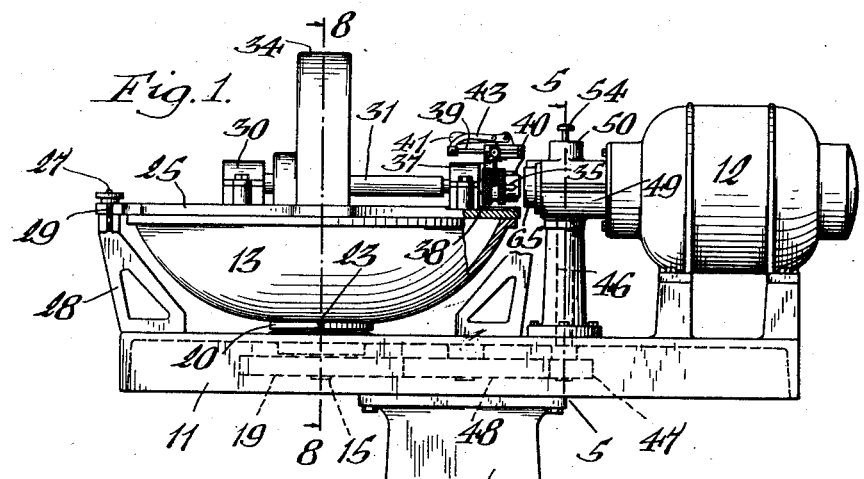

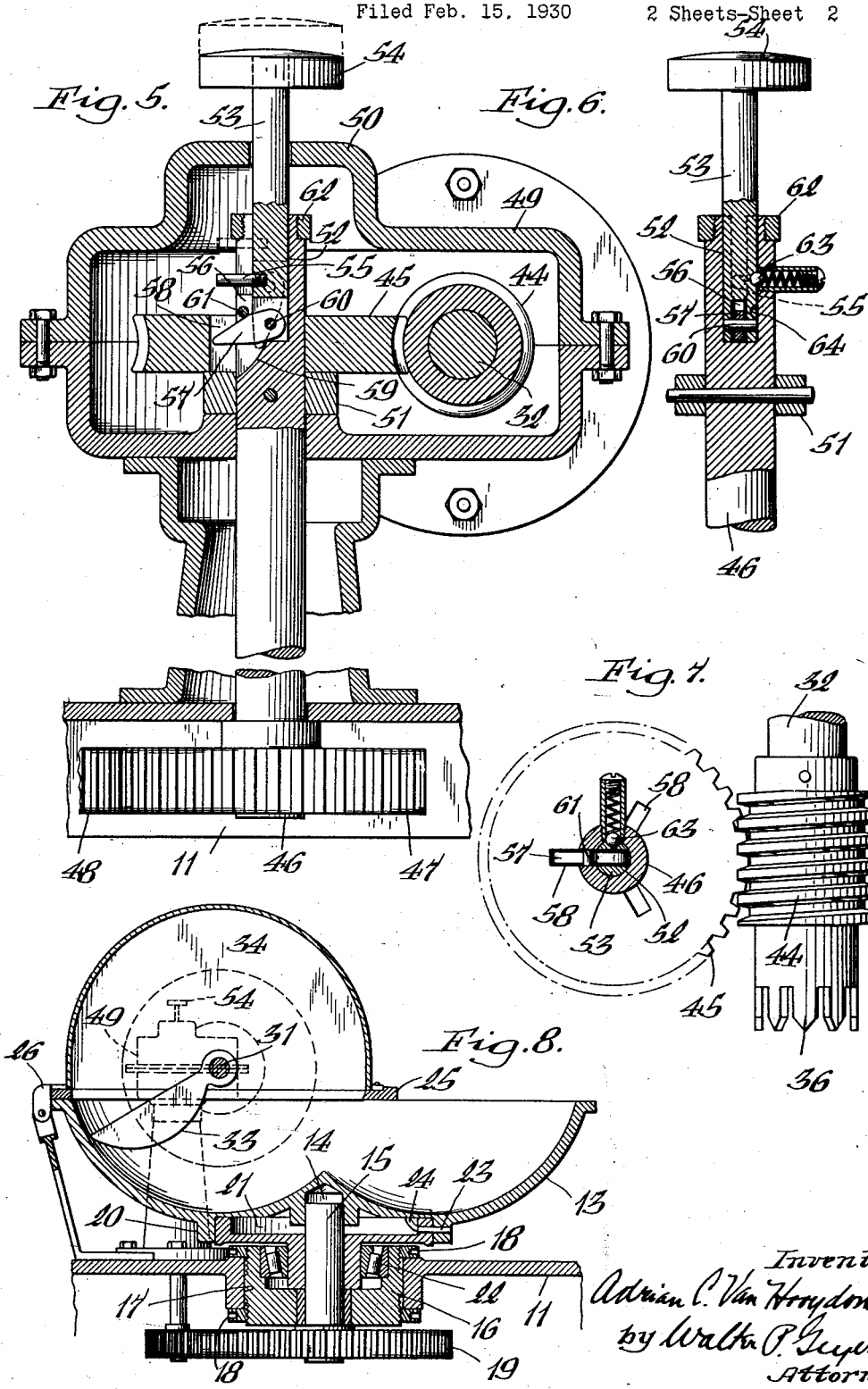

1,865,545

UNITED STATES PATENT OFFICE

ADRIAN C. VAN HOOYDONK, OF BUFFALO, NEW YORK, ASSIGNOR TO JOHN E. SMITH'S SONS COMPANY, OF BUFFALO, NEW YORK, A CORPORATION OF NEW YORK

FOOD CHOPPING MACHINE

Application filed February 15, 1930. Serial No. 428,554.

This invention relates to improvements in machines for chopping meat and foods of various kinds.

Its chief object is the provision of a machine of this character designed to meet the most exacting requirements and demands of present day food preparation and kitchen operation, and to embody therein novel features of construction and arrangement of parts which make for safety, speed, convenience and economy.

Another object of the invention is to provide the machine with simple and reliable means for controlling the stopping and starting of the meat bowl and for stopping the turning of the knives while the bowl is running, thereby affording perfect control of the food being chopped.

A further object is to produce an efficient food chopping machine which will reduce food waste to a minimum, and which embodies safety features for eliminating possibility of accidents.

In the accompanying drawings:—

Figure 1 is a front elevation of a food chopping machine embodying my improvements. Figure 2 is a top plan view thereof. Figure 3 is an enlarged fragmentary vertical section taken in the plane of line 3—3, Figure 2. Figure 4 is a fragmentary front elevation of the machine showing the cover-plate raised. Figure 5 is an enlarged fragmentary cross section taken on line 5—5, Figure 1. Figure 6 is a fragmentary sectional elevation of the bowl-driving shaft with its control. Figure 7 is a horizontal section taken on line 7—7, Figure 4. Figure 8 is an enlarged transverse vertical section taken on line 8—8, Figure 1.

Similar characters of reference indicate corresponding parts throughout the several views.

The various working parts of the machine may be mounted on a bench or pedestal type of support, that shown in the drawings depicting the pedestal type which includes a pedestal 10 and a head-plate 11. Secured to one end of the head-plate is an electric motor 12 which is preferably employed for revolving the meat bowl and knives of the machine. Surmounting the head-plate at one side of the electric motor is the revolving meat bowl or container 13 which is of the usual concavo-convex form and is provided centrally of its body with a downwardly opening socket 14 removably engaging the upper end of an upright shaft 15 journaled in a bearing collar 16 slidably fitted for vertical movement in an opening 17 in the head-plate 11. This bearing collar is preferably adjustable vertically in its opening to effect a corresponding movement of the bowl by means of nuts 18 applied to the upper and lower threaded ends of said collar and bearing against the opposing sides of the head-plate, as seen in Figure 8. Secured to the lower end of the shaft 15 is a gear 19 which is operatively connected with the motor 12 for rotating the bowl in the manner hereinafter described. Depending from the bowl and concentric with its socket 14 is a bearing flange or collar 20 detachably connected to a revolvable head or member 21 fixed on the shaft 15 and journaled in a roller bearing 22, the connecting means preferably consisting of a plurality of radial coupling pins 23 projecting from the bowl-flange and engaging corresponding spiral-like slots 24 in the rim of the revolvable head. These slots are so disposed that they firmly lock the bowl down onto the head and prevent its vertical displacement, the bowl being readily removed for cleaning or other purposes by giving it a fraction of a turn relative to the head to disengage its coupling pins from their companion slots.

A cover-plate 25 is arranged over the rear portion of the meat bowl 13 and is hinged at its rear end, as indicated at 26, so that it may be swung to a substantially upright position to permit the removal of the bowl when desired. The bottom side of this cover-plate bears against the outer edge of the meat bowl and when wear takes place between these parts the nuts 18 on the bearing collar 16 are correspondingly loosened or tightened to effect an upward movement of said collar and to bring the meat bowl into bearing engagement with the underside of the cover-plate. The latter is rigidly held in its normal horizontal position over the bowl by vertically-swinging clamping bolts 27 fulcrumed on brackets 28 secured to the base 11 at diametrically opposite sides of the bowl and engageable with corresponding notches 29 formed in the front edge of the cover plate.

Journaled in bearings 30 mounted on the top side of the cover-plate 25 is a horizontal cutter or knife-shaft 31 disposed in axial alinement with the shaft 32 of the electric motor 12 and having a plurality of knives 33 mounted thereon which are adapted to revolve into the meat bowl during its rotation for cutting the meat or other foods. A hood 34 may be provided for enclosing the cutters and knives. The cutter shaft 31 is selectively driven from the motor shaft through the medium of a clutch interposed between these shafts, the clutch consisting of a pair of jaw or tooth-like members 35, 36 applied to the opposing ends of the cutter-shaft and motor-shaft, respectively, and the teeth of such members are pointed at their leading ends to facilitate their engagement. The clutch member 36 is pinned or otherwise secured to its shaft while the companion clutch member 35 is feathered on its shaft for movement lengthwise thereof. The shifting of the clutch member 35 is effected through the medium of a shifting yoke 37 engaging the grooved collar 38 of said clutch member and attached at its upper end to a shifting rod 39 arranged parallel to the shafts 31, 32 and guided in an appropriate bearing bracket 40 secured to the top side of the cover-plate 25. The actuation of the rod 39 to bring the clutch members into and out of engaged position is effected by a hand lever 41 fulcrumed at 42 to the bracket 40 and connected to the rod by a link 43. Upon swinging the lever 41 from the full line position to the dotted line position shown in Figure 3, the clutch is shifted to its engaged position and upon swinging the lever in the opposite direction the clutch is disengaged. It will be noted from Figure 3 that the fulcrum of the lever 41 and the pivot of the link 43 therewith are disposed on a dead center line in the engaged or released position of the clutch-lever, thereby effectually locking the slide-rod 39 against movement in such positions. In the disengaged position of the clutch, the cover-plate 25 is free to be swung to an elevated position and at this time the knives 33 are at rest and housed within the hood 34, thereby eliminating danger of accidents when the cover is in such position.

Means are provided for controlling the rotation of the meat bowl 13 whereby the same may be operated simultaneously with or independently of the cutter shaft 31 and whereby the bowl can be stopped or started while the motor is running. To this end, the motor-shaft 32 carries a worm 44, which as seen in Figures 3 and 7, may have the clutch member 36 integrally formed therewith, and which is connected with a worm wheel 45 mounted on an upright shaft 46 provided at its lower end with a gear 47 operatively connected to the meat bowl gear 19 through an intermediate idler gear 48. The worm and worm wheel are preferably arranged within a suitable casing 49 attached to the adjoining end of the motor, and the shaft 46 is partially housed within this casing and within a tubular casing 50 rising from the head-plate and joined to the casing 49. The shaft 46 is provided with collars 51 to hold it against endwise movement relative to the worm wheel 41 and the surrounding casing, and this shaft is provided with controlling means for releasably coupling the worm wheel 45 therewith when it is desired to transmit motion to the bowl, and to disconnect said worm wheel from the shaft when it is desired to stop the bowl or prevent its rotation while the motor is running. This controlling means, as shown in Figures 5, 6 and 7, is preferably constructed as follows:—

Fitted in an axial opening or bore 52 formed in the upper end of the shaft 46 is a control member adapted to be moved into and out of coupling engagement with the worm wheel 45 and consisting of a lifting pin 53 provided at its upper end with an actuating knob 54 and adjacent its lower end with a radially-projecting key 55 engaging a vertical slot 56 in the upper end of said shaft 46. This key, in addition to coupling the lifting pin with the shaft to compel its turning therewith, also guides the pin and limits its up and down movement in bringing the same to its released and engaged positions with the worm wheel. At its lower end the lifting pin is provided with a vertically-swinging, pendant arm or key 57 which is adapted in the lower position of the lifting pin, shown by full lines in Figure 5, to project laterally from the shaft and engage one or another of a plurality of radial slots 58 formed in the worm wheel 45, and which in the elevated position of said lifting pin is retracted into the shaft-bore out of engagement with the worm wheel. The projection of the key 57 outwardly from the shaft into engagement with one or another of the worm wheel slots is effected by an inclined face or cam surface 59, such surface preferably constituting the lower edge of the slots 56 and intersecting the lower end of the shaft-bore 52, as seen clearly in Figure 5. It will be noted that this cam surface is curved or deflected outwardly and the lower end of the key 57 engages this surface, and as the lifting pin is lowered, the key is automatically swung outwardly on its pivot 60 into a substantially radially-projecting position beyond the surface of the shaft for engagement with the worm wheel. The disengagement of the pendant key 57 from the worm wheel is effected as the lifting pin 53 is raised, and the retraction of this key within the shaft-bore is accomplished by a pin or abutment 61 extending across the slot 56 immediately above the top side of the worm wheel 45, this pin serving as a guide for directing said key into the shaft-bore as the lifting pin is elevated to the dotted lines shown in Figure 5. In the full line position of this mechanism, shown in Figure 5, the key 57 is engaged with the worm wheel so as to compel the rotation of the worm wheel and in turn transmit motion to the shaft 46 to rotate the meat bowl. In the dotted line position, shown in the same figure, the key 57 is withdrawn from engagement with the worm wheel so that the worm wheel is free to rotate on the shaft 46 while the motor is running without transmitting motion to the meat bowl. In the elevated position of the lifting pin, it will be noted that the lower end of the key 57 is still in guiding contact with the cam surface 59, and that in this position the pin 55 abuts against a stop 62 consisting of a nut applied to the threaded upper end of the shaft 46. The lifting pin 53 is releasably held in its respective positions by a spring pressed ball 63 or the like adapted to interlock with one or the other of a pair of sockets 64 formed in the surface of said pin.

As seen in Figure 3, the clutch member 36 projects through the gear casing 49 and applied to the adjoining end of this casing and enclosing the teeth of this clutch member, is a safety-collar 65 which completely encases the teeth. so that in the raised position of the cover plate 25 there are no revolving, projecting parts, thereby providing maximum safety to the user of the machine.

Briefly stated the operation of the machine is as follows:—

Assume the parts to be in position ready for cutting or chopping the food which has been previously dumped into the meat bowl and that the electric motor is running and that the clutch lever 41 is in its released position, shown by full lines in Figure 3, and the lifting pin 53 of the control drive for the meat bowl is in its elevated or released position, shown by dotted lines in Figure 5. The operator, being ready, now shifts the clutch lever 41 from the full line to the dotted line position, shown in Figure 2 to effect the rotation of the cutter shaft 31 and pushes the lifting pin 53 downwardly to bring its pendant key 57 into engagement with the worm wheel 45 so that motion is transmitted to the shaft 46 and hence to the meat bowl. Whenever it is desired to stop the rotation of the cutters or the bowl, the respective control members 41 and 53 are moved to their released positions, it being possible by this construction to stop and start the rotation of the bowl while the motor is running and the knives can be stopped while the bowl is running, thereby giving perfect control of the food being chopped.

This machine is also capable of use with attachments of various kinds, such as meat grinders, fruit and vegetable slicers and the like and these can be readily coupled on to the right hand end of the electric motor and driven thereby, the revolving bowl and cutter driving mechanisms permitting the operation of these attachments without running the bowl or the cutter.

I claim as my invention:—

1. In a machine of the character described, the combination of a rotary bowl, a cover-plate arranged over said bowl, a cutter shaft journaled on said plate, a driving shaft disposed in line with the cutter shaft, cooperating clutch members applied to the opposing ends of said shafts, a driven shaft for the bowl geared to said driving shaft, the gear on said driven shaft being free to revolve thereon and having a key-way therein, and means applied to the driven shaft including a key adapted for releasable engagement with said key-way for controlling the transmission of motion to the bowl.

2. In a machine of the character described, the combination of a rotary bowl, a cover-plate arranged over said bowl, a cutter shaft journaled on said plate, a driving shaft disposed in line with the cutter shaft, cooperating clutch members applied to the opposing ends of said shafts, a driven shaft for the bowl geared to said driving shaft, the gear on said driven shaft being free to revolve thereon and having a key-way therein, and a shiftable controlling pin applied to said driven shaft to turn therewith and having a key projectable from the shaft in one position of the controlling pin for engagement with the key-way in said gear and retractable out of engagement with said key-way in the other position of said controlling pin.

3. In a machine of the character described, the combination of a rotary bowl, a cover-plate arranged over said bowl, a cutter shaft journaled on said plate, a driving shaft disposed in line with the cutter shaft, cooperating clutch members applied to the opposing ends of said shafts, a driven shaft for the bowl geared to said driving shaft, the gear on said driven shaft being free to revolve thereon and having a key-way therein, a shiftable controlling pin applied to said driven shaft to turn therewith and having a key projectable from the shaft in one position of the controlling pin for engagement with the key-way in said gear and retractable out of engagement with said key-way in the other position of said controlling pin and means for releasably holding the controlling pin in either of such positions.

4. In a machine of the character described, the combination of a rotary bowl, a cover-plate arranged over said bowl, a cutter shaft journaled on said plate, a driving shaft disposed in line with the cutter shaft, cooperating clutch members applied to the opposing ends of said shafts, a driven shaft for the bowl geared to said driving shaft, the gear on said driven shaft being free to revolve thereon and having a key-way therein, said shaft having an axial opening therein and a slot intersecting the same, and an axially-shiftable controlling pin disposed in said opening and having a pivoted key thereon projectable into and out of said slot for engagement with the key-way in said gear.

5. In a machine of the character described, the combination of a rotary bowl, a cover-plate arranged over said bowl, a cutter shaft journaled on said plate, a driving shaft disposed in line with the cutter shaft, cooperating clutch members applied to the opposing ends of said shafts, a driven shaft for the bowl geared to said driving shaft, the gear on said driven shaft being free to revolve thereon and having a key-way therein, said shaft having an axial opening therein and a slot intersecting the same and terminating in an inclined bearing face at its lower end, an abutment extending across the slot and spaced from its inclined bearing face, and an axially-shiftable controlling pin guided in the opening of said shaft to turn therewith and carrying a pendant pivoted key at its lower end projectable laterally into and out of said shaft-slot between its inclined lower end and said abutment for engagement with the key-way of said gear, the inclined bearing face of the slot guiding the pivoted key outwardly into coupling engagement with the gear when the controlling pin is moved downwardly and the abutment guiding said key inwardly out of engagement with the gear when said pin is moved upwardly.

6. In a machine of the character described, the combination of a rotary bowl, a cover-plate arranged over said bowl, a cutter shaft journaled on said plate, a driving shaft disposed in line with the cutter shaft, cooperating clutch members applied to the opposing ends of said shafts, a driven shaft for the bowl geared to said driving shaft, the gear on said driven shaft being free to revolve thereon and having a key-way therein, said shaft having an axial opening therein and a slot intersecting the same and terminating in an inclined bearing face at its lower end, an abutment extending across the slot and spaced from its inclined bearing face, an axially-shiftable controlling pin guided in the opening of said shaft to turn therewith and carrying a pendant, pivoted key at its lower end projectable laterally into and out of said shaft-slot between its inclined lower end and said abutment for engagement with the key-way of said gear, the inclined bearing face of the slot guiding the pivoted key outwardly into coupling engagement with the gear when the controlling pin is moved downwardly and the abutment guiding said key inwardly out of engagement with the gear when said pin is moved upwardly, and means for limiting the up and down movement of said shiftable controlling pin.

ADRIAN C. VAN HOOYDONK.